Sept. 20, 1960 K. LEHOVEC 2,953,759

SEMI-CONDUCTOR RESISTORS

Filed July 1, 1953

INVENTOR.
KURT LEHOVEC
BY
Connolly and Hutz
HIS ATTORNEYS

United States Patent Office 2,953,759 Patented Sept. 20, 1960

2,953,759

SEMI-CONDUCTOR RESISTORS

Kurt Lehovec, Williamstown, Mass., assignor to Sprague Electric Company, North Adams, Mass., a corporation of Massachusetts Filed July 1, 1953, Ser. No. 365,475

1 Claim. (Cl. 338—8)

The present invention relates to a new and improved type of resistance element.

At the present time, typical resistors consist of polycrystalline particles or films in which the actual resistance is located to a large extent at the grain boundaries between the separate particles or films. Constructions of this type are subject to several disadvantages. For example, the conduction of current at the junctions between the adjacent particles or films frequently leads to a relatively high noise level within the resistors. Also, the resistance is often strongly temperature-dependent, decreasing with increasing temperatures. Further, the actual resistance of a polycrystalline body is sensitive to the absorption of gases or the like at the grain boundaries, and this frequently results in changes in resistance which are not otherwise explainable. This absorption of gas is particularly thought to be noticeable with the so-called printed resistance layers consisting of conductive particles dispersed within a resin which is polymerized by heating following the application of the layer.

It is an object of the present invention to avoid the difficulties in prior resistors as discussed in the preceding paragraph. A further object of the invention is to create a new type of resistor which can be easily and conveniently made and in which the actual value of resistance can be made to vary with increasing temperatures in a predetermined manner. These and other objects of the invention, as well as the advantages of it, will be apparent from this specification, the appended claim, as well as the accompanying drawing in which:

Figure 1:
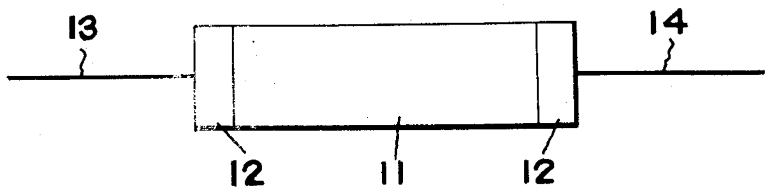
Fig. 1 shows a new resistor of the invention.

For convenience, both figures of the drawing are diagrammatic in nature.

The above and related aims of the invention are achieved by using as the resistance element a body of a single crystal of a semi-conductor. In the modification shown in the second figure of the drawing, two pieces of different single crystalline semi-conductive materials are joined together in order to form a temperature compensated resistor.

It is known that the resistance of a semi-conductor containing impurities varies with the temperature. The resistance of a homogeneous body is affected by two factors, namely the number of carriers present and the mobility of the carriers, while the temperature dependence of such a resistance body is the summation of the temperature dependence of the number of carriers and their mobility. The temperature dependence of a number of carriers in electronic semi-conductors is as follows: At very low temperatures, the carriers (electrons or holes) are created by the ionization of impurities and this temperature range will be referred to as the range of impurity conduction. At sufficiently high temperatures, the carriers (electrons and holes) are released in the crystal lattice and this temperature range will be referred to as the range of intrinsic conduction. In the range of impurity conduction the degree of ionization increases with temperature which results in large variation in the concentration of carriers with a change in temperature which means the concentration of carriers is highly temperature dependent. If the temperature increases, however, a point may be reached where all the impurities are fully ionized and yet the range of intrinsic conduction has not been reached. Between this temperature of complete ionization and the point in which intrinsic conduction occurs the concentration of carriers is temperature independent so that the temperature dependence of the conduction arises only from that of the mobility factor. The mobility of the carriers at low temperatures results from the scattering of impurities, whereas at higher temperatures it depends simply upon scattering of the crystal lattice. In the range of impurity scattering the resistance decreases with the increase of temperature, whereas in the range of lattice scattering the resistance increases with increasing temperature, provided the temperature range is restricted to that wherein the concentration of the carriers remains constant. Within the temperature range when the impurities are fully ionized, but before the intrinsic conduction of the material is reached, highly satisfactory resistors may be obtained by merely attaching low ohmic resistance electrodes upon exposed extremities of a semi-conductive single crystalline body.

Such a resistor is diagrammatically shown in Fig. 1 as consisting of a bar of a semi-conductive body 11 as described to the ends of which are attached low resistance electrodes 12 by means known to the art. Suitable leads 13 and 14 are, of course, attached to these electrodes.

A variety of single crystalline materials are acceptable for use with the invention. In general, only those materials at which the temperature range between the point when the impurities within the semi-conductor are fully ionized and before the intrinsic conduction of the crystal is reached is within a useable temperature range; that is, from about 15° C. up to about 200° C., are suitable. Such materials include silicon or germanium of either p or n type conductivity formed into single crystals in accordance with known procedures. Also, single crystals of semi-conductive compounds, such as for example, silicon carbide, are highly suitable for certain temperature ranges.

Figure 2:
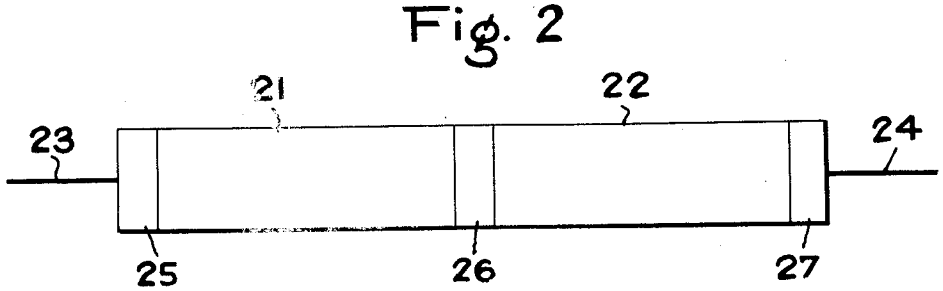
Fig. 2 shows a new modified resistor of the invention.

The modification of the invention pictured in Fig. 2 shows two single crystalline bodies 21 and 22 of different semi-conductive materials attached to one another and to leads 23 and 24 by low resistance connections 25, 26, and 27 in accordance with known procedures used in the art of transistor and rectifier manufacture. In this type of construction the first semi-conductor is a single crystal 21 as described above in connection with Fig. 1 of the drawing, while the second 22 is of a second material which exhibits intrinsic conduction over the same temperature range at which the first body exhibits relatively insensitive temperature response as discussed above. As a consequence of the two single crystalline bodies being connected in series, it is possible to form composite resistors of very low or controlled temperature coefficients of resistivity. Suitable materials for use with either germanium or silicon single crystals within the range of temperature of from slightly below room temperature to about 200° C. are tellurium, tellurium selenium alloys, tellurium selenium sulphur alloys, or tellurium sulphur alloys. Other materials, such as semi-conductive compounds in the single crystalline form are also suitable for the second resistance body. Alternatively, these units may be parallel connected to achieve circuit components for specialized applications. The implications of parallel connections are apparent from the foregoing discussion.

In forming the new resistors of the present invention, care must be taken in attaching the electrodes so as to prevent carrier injection and/or rectifier effects. The precise means of electrode attachment are of the same type commonly used in the manufacture of diodes and triodes of semi-conductors. Also, the new resistors of the invention must be protected against light since many semi-conductors are photosensitive. This can be accomplished as by encasing the new resistors in common opaque, resinous materials or within suitable light-proof casings. Inasmuch as the resistors are somewhat temperature dependent, it is advisable that they be mounted in a manner so that they are not subjected to extreme elevated temperatures during use.

As many apparently widely different embodiments of my invention may be made without departing from the spirit and scope thereof, it is to be understood that my invention is not limited to the specific embodiments hereof except as defined in the appended claim.

What is claimed is:

In an electrical device an electrical circuit including a resistor having a low temperature coefficient of resistance comprising a single crystal of semiconductive material having a substantially homogeneous impurity distribution, carriers in said crystal provided by ionized impurities, said resistor operated in a temperature range wherein said impurities are substantially all fully ionized whereby the concentration of said carriers is independent of temperature with said range, two spaced ohmic contacts on said crystal, leads of said circuit attached to said contacts and means for maintaining said resistor in said temperature range, thereby providing a semiconductive resistor in said circuit having a voltage current relationship in accordance with Ohm's law.

References Cited in the file of this patent

UNITED STATES PATENTS 2,631,356 Sparks et al. ............ Mar. 17, 1953

2,657,345 Stuetzer ............... Oct. 27, 1953